United States Patent [19]

Iida

[11] Patent Number: 5,418,976
[45] Date of Patent: May 23, 1995

[54] PROCESSING SYSTEM HAVING A STORAGE SET WITH DATA DESIGNATING OPERATION STATE FROM OPERATION STATES IN INSTRUCTION MEMORY SET WITH APPLICATION SPECIFIC BLOCK

[75] Inventor: Kouichi Iida, Kodaira, Japan

[73] Assignee: Hitachi, Ltd., Tokyo, Japan

[21] Appl. No.: 994,179

[22] Filed: Dec. 21, 1992

Related U.S. Application Data

[63] Continuation of Ser. No. 896,881, Jun. 10, 1992, abandoned, which is a continuation of Ser. No. 318,815, Mar. 3, 1989, abandoned.

[30] Foreign Application Priority Data

Mar. 4, 1988 [JP] Japan .................. 63-51398

[51] Int. Cl.$^6$ .............. G06F 3/05; G06F 13/10; G06F 12/02; G06F 15/20
[52] U.S. Cl. .................. 395/800; 364/221.6; 364/221.4; 364/229.5; 364/232.8; 364/232.9; 364/238.6; 364/240; 364/240.5; 364/239; 364/249.2; 364/238; 364/263.3; 364/276.4; 364/DIG. 1; 364/DIG. 2; 364/230.6
[58] Field of Search .............. 395/800, 200, 325, 250, 395/275, 775, 500, 400, 725; 364/DIG. 1, DIG. 2

[56] References Cited

U.S. PATENT DOCUMENTS

| | | | |
|---|---|---|---|
| 4,310,896 | 1/1982 | Cutler et al. | 364/900 |
| 4,516,199 | 5/1985 | Frieder et al. | 364/200 |
| 4,564,900 | 1/1986 | Smitt | 364/200 |
| 4,821,034 | 4/1989 | Anderson et al. | 379/271 |
| 4,922,432 | 5/1990 | Kobayashi et al. | 364/490 |
| 4,926,355 | 5/1990 | Boreland | 395/725 |
| 4,935,867 | 6/1990 | Wang et al. | 395/400 |
| 4,947,395 | 8/1990 | Bullinger et al. | 371/22.6 |
| 4,984,195 | 1/1991 | Nakamura et al. | 364/200 |
| 5,005,173 | 4/1991 | Martin | 371/22.6 |

OTHER PUBLICATIONS

"Nikkei Electronics", published by Nikkei McGraw-Hill, Inc. Aug. 25, 1986, (No. 402), pp. 190–191 (translation).

Primary Examiner—Alyssa H. Bowler
Assistant Examiner—Daniel H. Pan
Attorney, Agent, or Firm—Fay, Sharpe, Beall, Fagan, Minnich & McKee

[57] ABSTRACT

The core DSP is extended to a functional module extension, for example having extended memory and input-/output circuitry, which extended module is mapped in the address base of the data storage of the core DSP, whereby an ASIC-expanded LSI may be wholly formed on a single semiconductor substrate in an efficient manner. That is, the data transfer, address signals and control signals usable within the core with respect to the core memory are equally applicable to the extended module, so that the core DSP does not have to be re-evaluated and the core instruction sets and software are equally applicable without debugging, when the core DSP is extended for a specific application by adding an extension module.

47 Claims, 7 Drawing Sheets

PROCESSING SYSTEM HAVING A STORAGE SET WITH DATA DESIGNATING OPERATION STATE FROM OPERATION STATES IN INSTRUCTION MEMORY SET WITH APPLICATION SPECIFIC BLOCK

This application is a continuation of application Ser. No. 07/896,881, filed Jun. 10, 1992, now abandoned which is a continuation of application Ser. No. 07/318,815, filed Mar. 3, 1989, now abandoned.

BACKGROUND OF THE INVENTION

The present invention relates to digital signal processors, DSP, and more particularly to the LSI implementation of a DSP, based upon ASIC, application specific integrated circuit.

Digital signal processors could perform various processes on digital signals, including digital computation and conversion based upon retrieval, filtering, equalization, the removal of noise or echoes, modulation, Fourier transformations, the extraction of the characteristic parameter of a signal, prediction, picture emphasis, etc. In order to execute such digital signal processes in real time or at high speed, various digital signal processors have been provided.

For the purpose of obtaining a high processing ability in the limited field of the digital signal processor, a special architecture has been adopted, by way of example, involving a data memory, a program memory and buses interrelating these, whereby the data bus is separate from the program memory bus, for parallel processing in this high speed. Therefore, it is possible to perform an instruction fetch, a data transfer and a computation in parallel with each other through a pipeline process. A multi-port memory is packaged in the DSP, and the data bus is preferably divided into a plurality of parts, thereby making it possible to transfer a plurality of data items in parallel, although such parallel data bus is not essential to the basic DSP. Further, a DSP may have a multiplier unit in addition to the adder unit of the ALU, which multiplier unit and ALU unit are individually disposed for parallel connection to the data memory to simultaneously receive plural items, each from the data memory, for execution of multiplying and adding operations at high frequencies in parallel.

In such a high speed digital processor, the internal data bus thereof need not be directly open to the exterior, so that the host interface portion of the processor is constructed of registers, so that data is transferred between these registers and the interior of the DSP through dedicated instruction such as register transfer instructions, all so that the DSP may operate at the required high processing speed.

The DSP is further disclosed, in general, in "Nikkei Electronics", published by Nikkei McGraw-Hill Inc., August 1986, pp. 183–184.

SUMMARY OF THE INVENTION

It is an object of the present invention to provide a DSP that is particularly applicable to ASIC, application specific integrated circuit, whereby the DSP may be adapted quickly to various specific applications in a more efficient manner than previously accomplished.

The present invention is related to studies made by the inventor on the technology for expanding a digital signal processor, DSP, used as an ASIC, in such a way that the fundamental circuit blocks necessary for the DSP are used as a core, that is repeatable without change for various different applications. These studies have revealed that the prior art DSP has not given any consideration to expanding the DSP as an ASIC. It is an object of the present invention to add a desired extending block around a core DSP, thereby to construct an entirely new DSP as a whole based upon a specific application, without redesigning the core DSP.

By way of an example, in the case of a digital processor of the type in which an internal data bus is not directly open to the exterior and is interfaced with the exterior through data transfer instructions for registers constituting a host interface portion, when it is intended to add a timer block and a parallel input/output circuit block, the instruction codes for coping with the new data transfer instructions must be added, without the present invention, for the transfer of data between the additional blocks and the existing internal blocks. In consequence, the fundamental alternation of software for the instruction code set of the DSP must be accomplished, without the present invention, and a logic verification or test of the alteration and the new software debugging are required all on the scale of an entirely newly constructed DSP, without the present invention. Therefore, the labor involved in developing a new LSI in spite of the addition of the partial input/output function, is very great, without the present invention. Furthermore, when constructing such a DSP with LSI, the original development work relating to the basic processor and its software must be constructed anew by adding new functions, so that an evaluation chip needs to inevitably be developed anew, for testing purposes.

It is an object of the present invention to avoid the above mentioned problems. Particularly, these problems are avoided by constructing a DSP that could easily be functionally extended. Another object of the present invention is to provide a DSP including a versatile core portion, so that added functions can be provided to the processor without debugging, that is the core portion instruction set and software is applicable to the functional extension, according to the present invention.

According to the present invention, it is an object to extend a DSP to make it possible to transfer data, address signals and control signals that are applicable to the core DSP to outside of the core DSP to be equally applicable to the DSP extension. The core DSP is extended to a functional module extension, for example having extended memory and input/output circuitry, which extended module is mapped in the address base of the data storage of the core DSP, whereby an ASIC-expanded LSI may be wholly formed on a single semiconductor substrate in an efficient manner. That is, the data transfer, address signals and control signals usable within the core with respect to the core memory are equally applicable to the extended module, so that the core DSP does not have to be re-evaluated and the core instruction sets and software are equally applicable without debugging, when the core DSP is extended for a specific application by adding an extension module.

According to the present invention, an evaluation chip corresponding to the core block is prepared beforehand, and when it is desired to extend the DSP by adding an extension module mapped in the address base of the data storage of the core, an extending interface of the core is included in the evaluation chip, whereby a software debugging emulation processor wholly formed on a single board can be constructed.

Thereby, when adding an extension module to the core DSP, through the coupling of the extending interface, the existing input/output instructions that apply for access control to the built in data storage of the DSP core are also rendered applicable to accesses to the extending function module, so that the functional extension of the DSP can be readily achieved without exerting any influence on the core block. That is the core block does not have to be re-evaluated and the core block instruction set of the software does not have to be debugged or changed. Thus, the DSP, to be ASIC expanded, can be obtained in a very short time, compared to the construction before the present invention, and the processor for functionally debugging extended software as required in the correspondence with the obtained digital signal processor can be provided immediately.

BRIEF DESCRIPTION OF THE DRAWINGS

Further objects, features and advantages of the present invention will become more clear from the following detailed description of a preferred embodiment, shown in the accompanying drawing, wherein.

DETAILED DESCRIPTION OF THE PREFERRED EMBODIMENT

Figure 1:
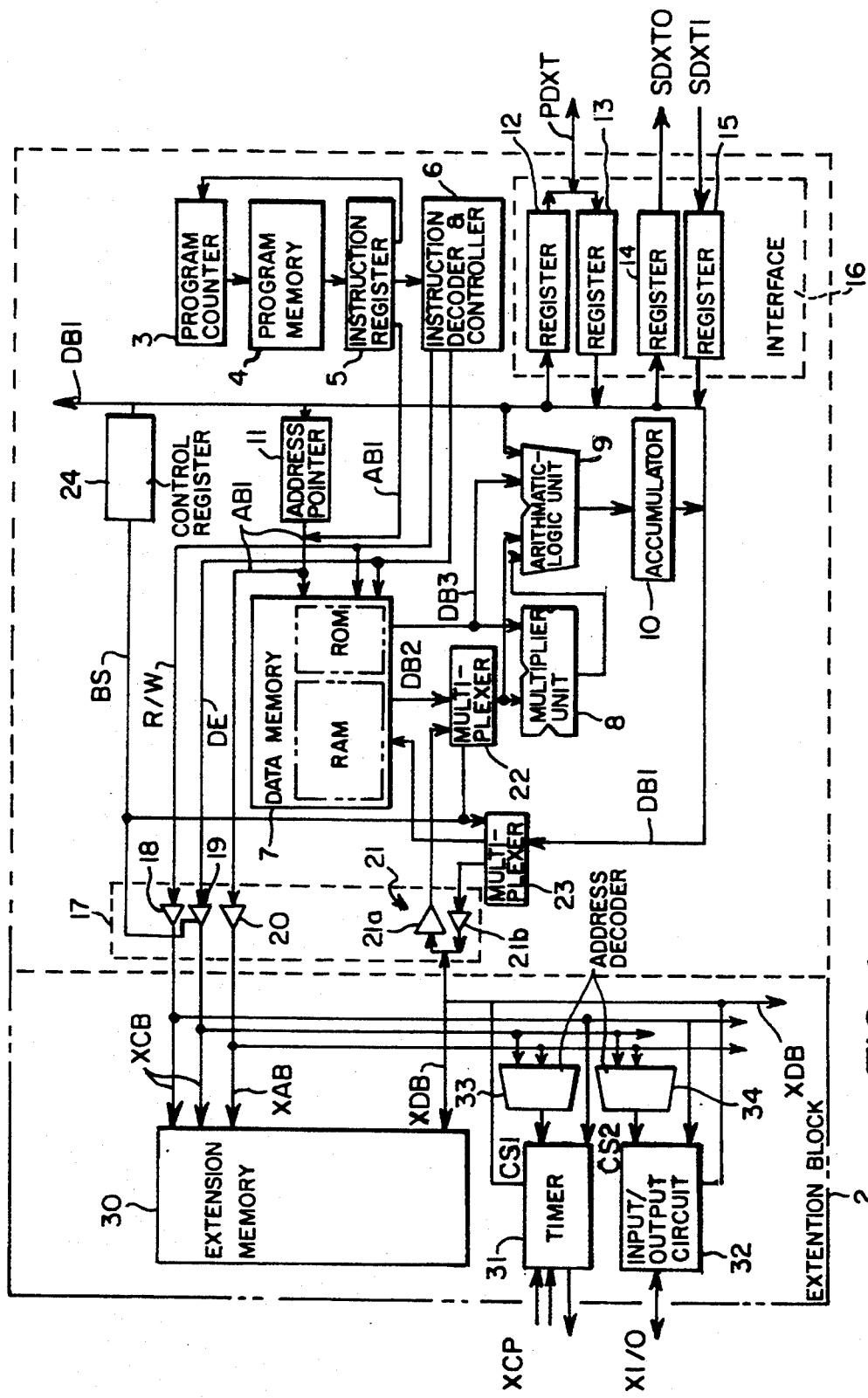
FIG. 1 is a block diagram of a digital signal processor, DSP, according to the present invention.
Figure 5:
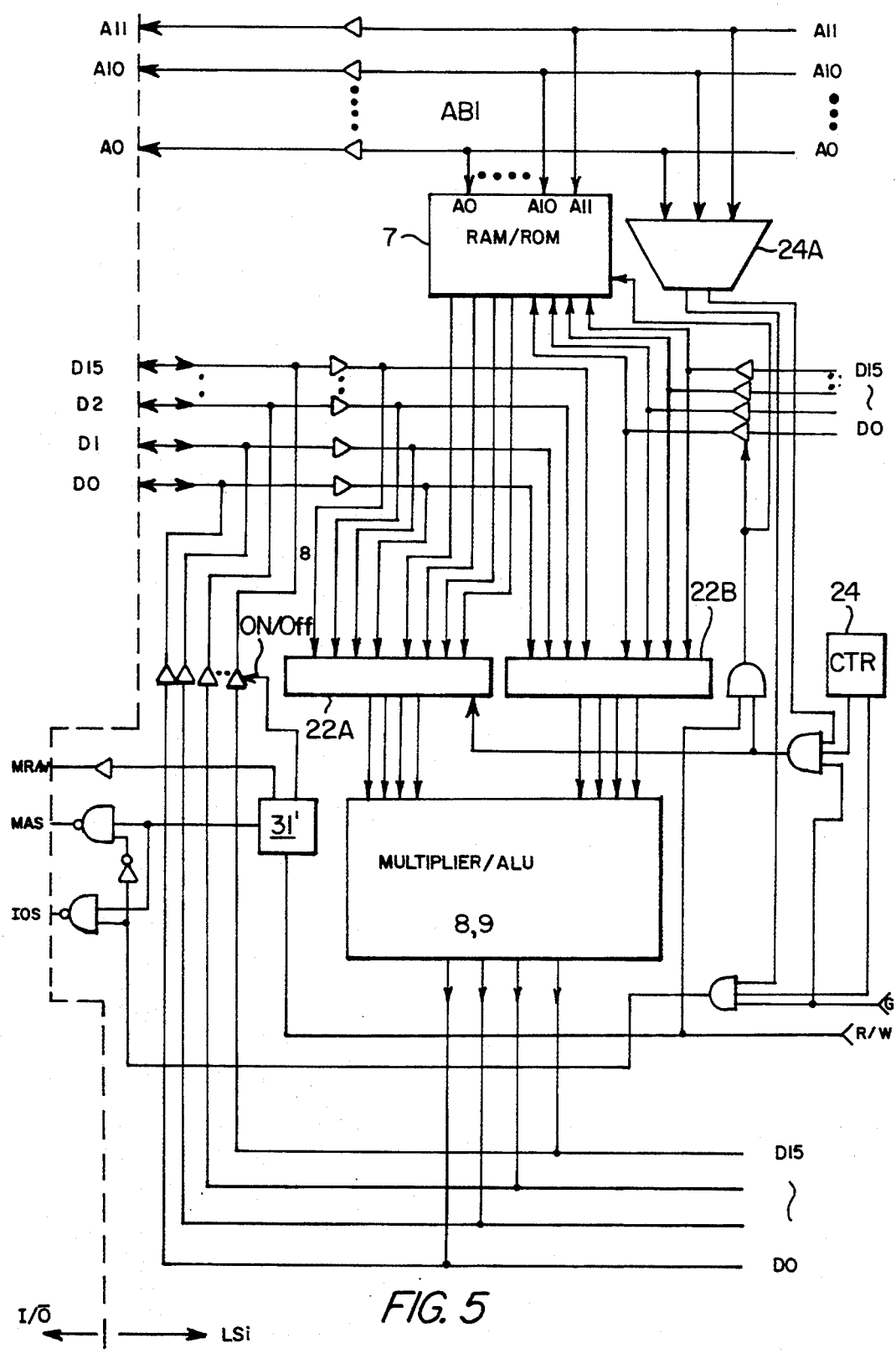
FIG. 5 is a detailed diagram of the core DSP according to the present invention.
Figure 8:
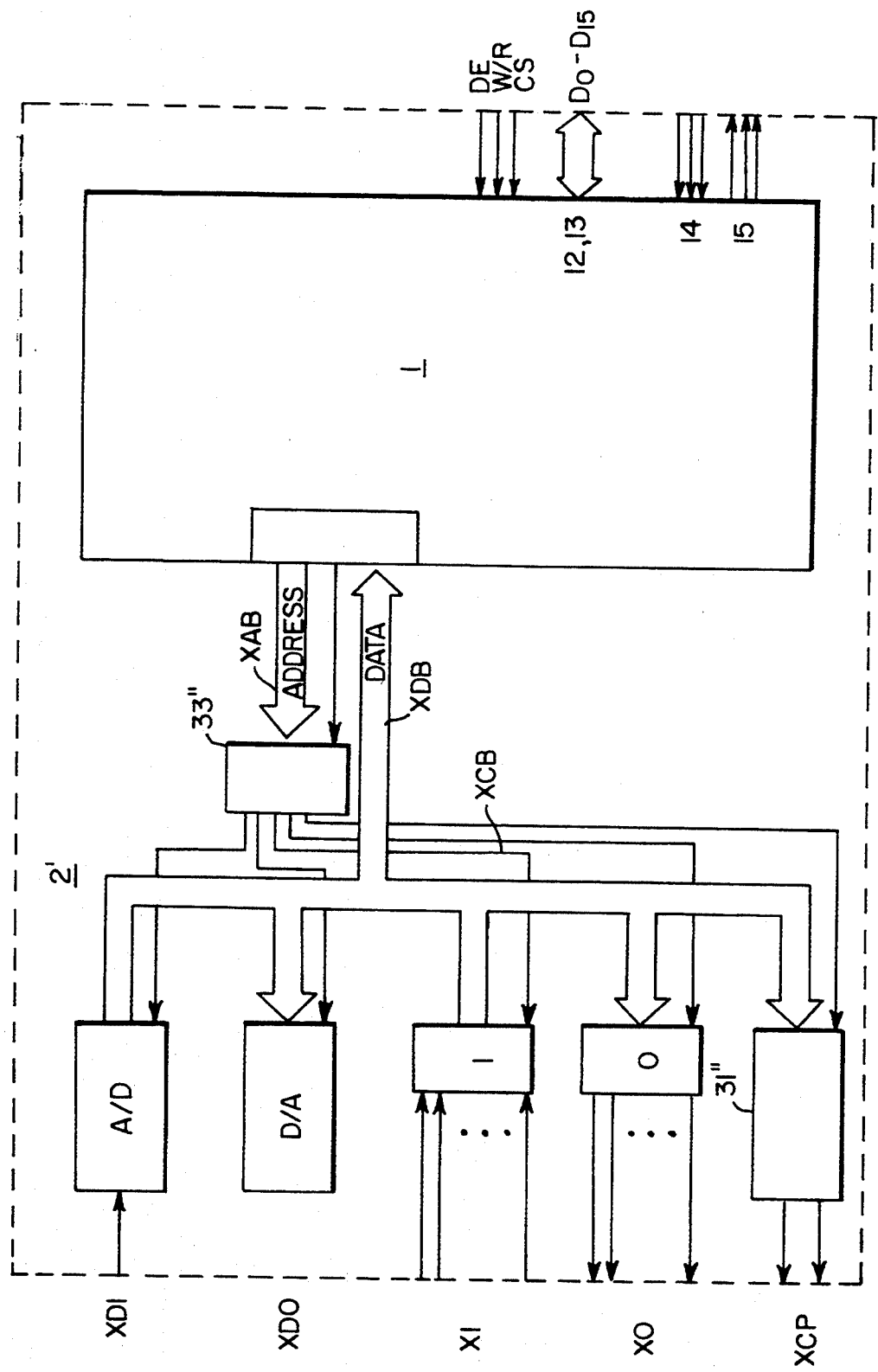
FIG. 8 shows a completed ASIC, similar to FIG. 1, but employing a different extension module.

According to the present invention, a core DSP 1 shown in FIG. 1 and 1' shown in FIG. 5 is standardized in construction and software for constructing a plurality of entirely different ASIC's, for example the ASIC of FIG. 1 and the different ASIC of FIG. 8. The different ASIC's are constructed by adding an extending module 2 in FIG. 1 to the core DSP 1 as shown in FIG. 1 or an entirely different extending module 2' to the core DSP 1. That is, basic expansion can be provided with respect to the basic DSP core 1, by merely adding on an extending module 2.

The core DSP functions completely as an independent DSP. In order to achieve a high processing ability, the core DSP 1, as shown in FIG. 1, has an instruction control loop, a data transfer and computation loop separated from the instruction loop, and pipe line processing of an instruction fetch, data transfer, and computation in parallel.

The instruction loop is constituted by a program counter 3, a program memory 4 that is addressed by the output of the program counter 3, and an instruction register 5 that fetches an instruction delivered as an output from the program memory 4 and which can feed back to the program counter 3, all as indicated. The instruction decoder and controller 6 decodes the instruction from the instruction register 5 and produces control signals on a control bus. The control bus includes the lines having the control signals R/W for a read/write signal, DE for data enable, and other instructions, not shown, that are common to digital signal processing and fed to the memory 7.

The data transfer and computation loop includes a data memory 7 that is basically constructed of a RAM, random access memory, which is utilized generally for computations, and a ROM, read-only memory, which is generally used for containing constant data for use in filtering, Fourier transformation, and the like. The data memory 7 is constructed for parallel processing, that is it has a data bus divided with individual ports, whereby a plurality of data items can be transferred from and to the data memory 7 in parallel. This loop further comprises a multiplier unit 8 and an ALU, arithmetic logic unit 9 constructed separate from the multiplier unit. Thereby, multiplying and adding operations of high frequencies can be executed in parallel. That is, the data bus DB2 and the data bus DB3 are connected to both the multiplier 8 and the ALU 9, whereby one item for computation can be transferred over DB2 from the memory 7 to the multiplier 8 at the same time that another item for computation can be transferred from the data memory 7 over the DB 3 to the multiplier 8, so that two items for multiplication can be parallel transferred to the multiplier 8, and the result of the multiplication can be fed, as shown to the ALU 9. Similarly, both DB 2 and DB 3 are connected to the ALU 9, for parallel processing; for example, two numbers respectively carried by DB 2 and DB 3 can be simultaneously transferred from data memory 7 into ALU 9, whereby an arithmetic process can be performed on them and the result transferred, as shown, to the accumulator 10. Thereby, the data bus is divided for parallel processing with respect to both the ALU and the multiplier for receiving data from the data memory 7. By way of example, the write port of the RAM included in the data memory 7 is coupled to the data bus DB 1 through a multiplexer 23. DB 1 is connected to the output of the accumulator 10. The respective read ports of the RAM and the ROM are coupled to the data buses. DB 2 and DB 3, as mentioned, whereby the data items read out into the data bus DB2 are respectively supplied to the multiplier 8 and the ALU 9 in parallel through a multiplexer 22, and data items read out on to the data bus DB 3 are respectively supplied to the multiplier 8 and the ALU 9 in parallel. Further, the output of the multiplier 8 can be supplied to the input terminal of the ALU 9 on one side for the purpose of cumulative operation, and the input terminal of the ALU 9 on the other side is also coupled to the data bus DB1. The output of the ALU 9 is brought back to DB 1 through the accumulator 10.

Although not especially restrictive, the data memory 7 is addressed by the output address signal placed on the address bus AB 1 by the address pointer 11 that is delivered by incrementing or decrementing data set through the data bus DB 1 to the address pointer 11. Alternatively, the data memory is addressed by an address signal that is supplied from the address field of the instruction through the instruction register 5 and placed upon the address bus AB 1.

Figure 7:
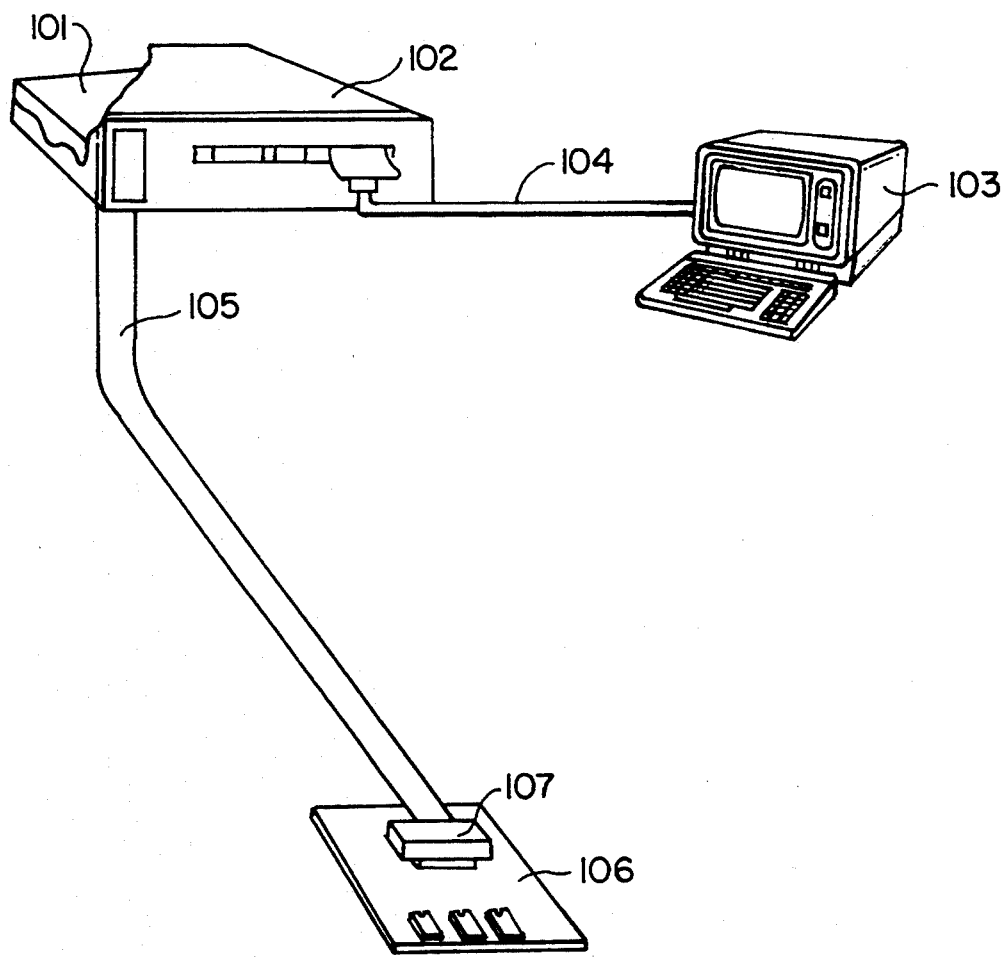
FIG. 7 shows the evaluation system usable with the conventional techniques and with the present invention.

The DSP core 1 is located as a peripheral module operating under control of a host computer, such as that shown in FIG. 7, to be described later. Thus, in normal use, the DSP core will operate as a peripheral for a host computer, as a part of a specific application system. Although not especially restricted, the host interface 16 of the core DSP 1 is constructed of a parallel output register 12 connected to the data bus DB 1 and parallel data external terminal DPXT operating as an external connection terminal for the integrated circuit including the single chip the DSP core 1. Also, a parallel input register 13 is connected between the external terminal PDXT and the data bus DB 1. Thereby, the parallel output of register 12 and parallel input register 13 are used for the parallel transfer of data between the host computer shown in FIG. 7 and the core DSP 1 of FIG. 1. In addition, a serial output register 14 is connected between the data bus DB 1 and a serial data external terminal SDXTO. The serial input register 15 is connected between the data bus DB 1 and the IC external terminal SDXTI for serial data external terminal input. Thus, with registers 14 and 15 serial data can be transferred between the DSP 1 and the host computer of FIG. 7.

It is to be noted that the above described host interface 16 does not directly open the internal data buses DB 1 and DB3 to the exterior. In view of the nature of the digital signal processor, to directly open the data buses (not in accordance with the present invention) would produce a low operating speed for the DSP core, because the DSP would have to adopt its procedure to the host, so that the parameters necessary for successful operation with respect to the exterior, particularly the host, would render the DSP slower. However, the DSP of the present invention employs the registers 12, 13, 14, 15, isolating the external terminals PDXT, SDXTO, SDXTI from the data buses. Thereby, the data buses are not directly opened to the host computer.

The above described structure, namely, the host interfacing, the instruction control loop, and the data transfer and computation loop, constitute an entirely self contained and functioning DSP, that can communicate with a host computer for both serial and parallel data transfer, and which can internally parallel process instructions while at the same time processing data, particularly parallel processing data with respect to a data memory and an ALU.

According to the present invention, this basic DSP core is provided with the further structure for its interface to an extension module 2. The interface includes the following structure. Thereby, with the present invention, it is easy to interface the DSP core with an extension module, where the extension module is designed for a specific application without changing the DSP core, for a plurality of different applications. For this purpose, the DSP core 1 is provided with an extension interface 17, which will provide for the interfacing of the address signals, data and control signals, more specifically provides for the transfer of such data, address signals and control signals to the exterior of the DSP core 1 instead of their being applied to the data memory 7 or the host computer. That is, the extending interface 17 makes it possible to construct a so called memory map I/O to which data, control signals, and addresses can be input/output with the same measures, that is the same instruction set, as that of the input/output controls of the data memory 7.

According to the embodiment, the extending interface 17 comprises an output buffer 18 that delivers the read/write signal R/W, an output buffer 19 that delivers the data enable control signal DE, an output buffer 20 that delivers the address signal supplied on the address bus AB 1 as it is connected to the data memory 7, and a bi-directional buffer 21 that consists of an output buffer 21b for delivering data applied from the data bus DB 1 throughout the multiplexer 23 and an input buffer 21a for permitting data to be supplied to the multiplier unit 8 as well as the ALU 9 throughout the multiplexer 22. That is, the buffers 18, 19, 20, 21 provide for interfacing between the core DSP 1 and the extension module 2 with respect to the address bus AB 1, the control bus (including lines containing control signals R/W and DE), and the data bus DB 1. By way of an example, when the read/write signal R/W instructs a read operation, the input buffer 21A is controlled to the operable state. When the read/write signal R/W instructs a write operation, the output buffer 21b is controlled into its operable state. Thus, the extension module 2 and the data storage 7 are simultaneously placed in either read condition or write condition with the same control signal. Further, the read/write control signal and address signal are respectively passed through the buffers 18, 20 to the extension module 2 at the same time that they are passed to the data memory 7, so that these same control and address signals are equally applicable to the extension module 2 and the data memory 7.

The change over between operation or access to the extension module 2 coupled to the extending interface 17 and the access to the data memory 7, for example the RAM, is controlled in accordance with a bank select bit BS, which is set by a control register 24 in response to data on the data bus DB 1. For example, the bank select bit BS may be set to "0" or "1" on the basis of an instruction. For example, with the bank select bit BS set to "0", the data memory 7 may be enabled, the buffer 19 turned off, the multiplexer 23 set to pass data from DB 1 to the memory 7, and the multiplexer 22 set to pass data from DB2 to multiplier 8 and the ALU 9. This would be normal core DSP operation. Similarly, with the bank select bit BS set to "1", the buffer 19 would be operable to pass the data enable control signal to the extension module 2, the data memory 7 would be disabled, the multiplexer 23 would be changed to pass data from DB 1 to the output buffer 21b, and the multiplexer 23 would be set to pass data from the input buffer 21a to the multiplier 8 and the ALU 9 for extension module processing. Thereby, extension module processing can be conducted with the same control signals, address signals and data bus alternately with the core DSP 1.

This completes the description of the construction of the core DSP 1, although more details are set forth in FIG. 5. This core DSP 1, without change in any way, can be attached to many different kinds of extension modules to form various ASIC's.

For example, one type of extension module 2 is shown in FIG. 1. The extension module 2, in FIG. 1, includes an extension memory 3, which serves to extend the RAM in the data memory 7, and a timer 31 so that the timing of the memory 30 may be different than the timing of the memory 7, for example memory 30 may be cheaper and slower in running speed with respect to the memory 7 of the core DSP. Thus, the memory 30, in addition to being cheaper, could be matched to a slower speed of some application process accessible through the application port of the extension module 2. Thus, the timer 31 can exchange timing signals and other control signals through extension control port XCP a terminal that is external for the IC, because the extension module 2 and the core DSP 1 are constructed as an integrated circuit on a single substrate to constitute a single chip IC. Further, the extension module 2 includes input/output circuit 32 interfaced with the application system through an extension port, that is an external terminal on the IC, namely XI/O. The data input/output terminals of the extension memory 30, timer 31 and parallel input/output circuit 32 are coupled to the bi-directional buffer 21 on the extension data bus XDB. The control signals, for example the signals R/W and DE are communicated on the extension control bus XCB between the core DSP buffers 18, 19, the extension memory 30, timer 31, I/O circuit 32, and address decoders 33, 34 for control of the extension module with the same control signals as are used in the core DSP 1. The extension module 2 has an extension address bus XAB, which provides for a transfer of address signals from the DSP core 1, buffer 20 to the extension memory 30, address decoder 33, and address decoder 34. As shown, the extension address bus, the extension control bus, and the extension data bus all have arrows indicating that they may be connected to further elements of the extension module, as desired. Therefore, the timer and the parallel input/output circuit 32 can have their respective operations selected by the chip select signal CS1 delivered as an output from the address decoder 33 and by the chip select signal CS2 delivered as an output from the address decoder 32, respectively. The address decoder 33 and 34 are activated by asserting the data enable signal DE supplied through the output buffer 19. In cases where address signals supplied from the output buffer 20 agree with the allocated addresses to the respective address decoders and with the existence of the signal DE in the extension module 2, the chip select signals CS1 and CS2 are asserted. Extension module 2 is coupled to the extending interface 17 with the so-called memory mapped IO, whereby the existing memory IO instructions that are applied for access control of the data memory 7 included in the DSP core 1 can be equally applied for access control to the extension module 2.

Figure 2:
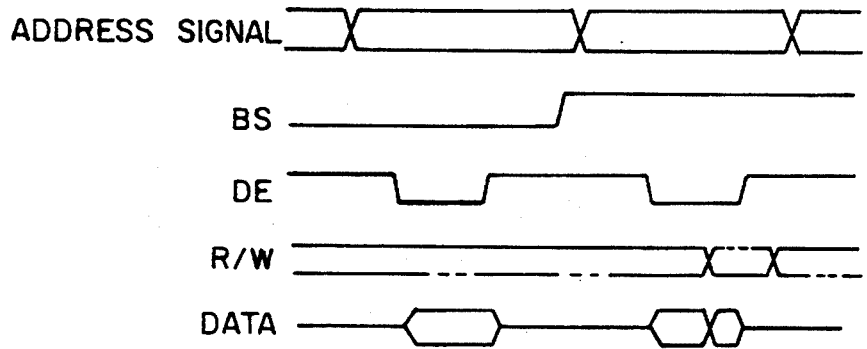
FIG. 2 is a timing diagram applicable to the embodiment of FIG. 1.

As shown in FIG. 2, in the case where the RAM of the data memory 7 included in the core DSP 1 is to be accessed, for example, the bank select bit BS of the control register 24 is set at "0". In response to this, the data enable signal DE is not supplied to the extension block 2. Thus, when the address signal and the read/write signal R/W are output and the data enable signal DE is asserted, the read data of the RAM in the memory 7 is permitted to be supplied to the multiplier unit 8, the arithmetic logic unit 9, and to the multiplexer 22, and the write data is permitted to be written from the data bus DB1 into the RAM through the multiplexer 23.

On the other hand, in a case where the extension module 2 is to be accessed, the bank select bit BS of the control register 24 is set at "1". In response to this, the data enable signal DE is supplied to the extension module 2. The multiplexer 22 is controlled to select and deliver the data from the input buffer 21a, while the multiplexer 23 is controlled to supply data to the output buffer 21b. Thus, when the address signal and the read/write signal R/W are output and the data enable signal DE is asserted, the read data from the extension block 2 is permitted to be supplied to the multiplier unit 8 and the arithmetic logic unit 9 through the multiplexer 22, and the write data is permitted to be written from the data bus DB1 into the extension module 2 throughout the multiplexer 23. As memory cycles from the data memory 7 or extension module 2, it is possible to adopt, not only a read cycle and a write cycle, but also a read-modify-write cycle.

According to the present invention, the following effects are attained: (1) when an extension module including desired functions is coupled to the extension interface 17 of the standard DSP core 1, it is possible to transfer data, address signals and control signals to the extension module 2 instead of providing access to the RAM and the data memory 7, and existing memory input/output instructions applied for access to the data memory 7 are equally applicable to access to the desired function modules of the extension module 2, whereby the functional extension of the DSP core 1 can be easily accomplished without requiring alterations of the software or hardware of the DSP core 1. That is, the core block 1 and the extension block 2, that is the DSP core 1 and extension module 2 are separated with respect to their hardware and the extension block 2 constitutes a memory map I/O with respect to the DSP core 1, wherein by the access control of the extension block 2, especially the internal access control of the I/O circuit included in the extension block module 2 does not require the addition of new instruction codes for new register transfer instructions and thereby the DSP 1 can be easily extended. In the case of adding the extension module 2, the verification or test of new logic on the core of block 1 is completely unnecessary with the present invention, because there is no change in the core DSP 1, according to the present invention with adding on different newly designed extension modules. Therefore, the period of time required for the logical verification, testing, or evaluation of the entire LSI (core DSP 1 and extension module 2) is greatly shortened as compared to the traditional techniques. Thus, the digital signal processor utilizing the core DSP 1 according to the present invention in ASIC with a variety of different extension modules 2 that have additional functions can be easily obtained in a short period of time.

(2) According to the above effect, it is possible to facilitate the ASIC expansion that a digital signal processor directed toward a specific use is obtained by selecting the function of the extension block 2. In such a case, the core DSP 1 and the extension module 2 can be formed on a single semiconductor substrate into a single-chip structure. Alternatively, they can be respectively formed on individual substrates into a multi-chip structure, though less preferred.

(3) The software debugging necessitated according to ASIC expansion of a digital signal processor can be readily obtained in such a way as the desired extension module formed on a board by a TTL circuit, etc., is coupled to an evaluation chip corresponding to the core DSP as prepared beforehand. Thus, a system, that includes the ASIC-expanded DSP can be developed quickly.

(4) The extending interface 17 constructs the so-called memory mapped I/O and the extension module 2 becomes accessible with the same procedures and at the same speed as those with respect to the built-in data memory 7 within the DSP core 1. Therefore, the functional extension of the DSP with high speed processing can particularly be achieved and throughput thereof is not lowered, even despite the addition of slower functions in the extension module.

There is a variation of the above; the change-over selection between access to the extension module 2 and access to the data memory 7 of the core DSP 1 has been performed by the set value of the bank bit BS and multiplexers, so that the selected states can be controlled by the above set value. However, it is also possible that a gate may be provided for this selectivity, which gate will cut off access control signals to the data memory 7 and the extension module 2, alternatively, under the control of a control bit or bits.

Further, the data memory 7 is supplied with a data enable signal DE during the access to the extension module 2. However, if this state is inconvenient for the data memory 7, the multiplexer as controlled by the signal BS can be provided also for a control signal such as the data enable signal DE. Moreover, the access control signals to be supplied to the extension module 2 are unrestricted to a read/write signal and a data enable signal, but they can also provide other control signals in addition or alternatively according to data storage, such as data memory, equivalent for both the extension module and the core DSP. Further, the host interface portion can also comprise several registers.

The present invention can also be extensively applied to special purpose digital signal processes for a data modem, speech synthesis, etc.

According to the above, the core DSP can be constructed, tested, and provided with an instruction set that is equally applicable to a plurality of different extension modules, without reconstruction or retesting of the core DSP. This makes it possible, with the extending interface, to transfer data, address signals and control signals, to the extension module, instead of to the data storage of the core DSP 1. Thereby, it is possible to bring about the functional extension of the core DSP according to specific applications, for ASIC, without any alteration of the structure or instruction code or the like of the core DSP.

Moreover, the extending interface realizes a construction such as the so-called memory mapped I/O. Whereby an extension module is accessible by the same procedures and at the same speed as the data storage of the core DSP, and hence, the invention will enforce the effect that the function extension of a digital signal processor operating at high speed can be easily accomplished without lowering the throughput of the core DSP.

Further, software debugging necessitated by the functional extension for ASIC expansion of a digital signal processor can be readily obtained in such a way that the evaluation chip that corresponds to the core DSP comprising the extending interface is prepared beforehand so as to be utilized versatility with the desired extension module also formed on the board by a TTL circuit, for example, coupled by the extending interface. Thus, the invention brings forth the effect that the system including the ASIC expanded digital signal processor can be developed quickly.

Figure 3:
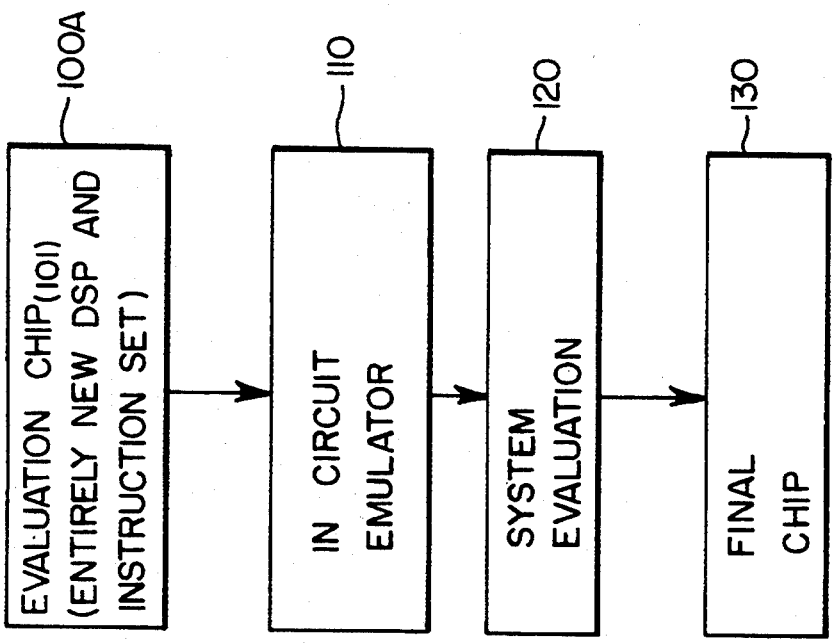
FIG. 3 is a flow chart showing the development of an ASIC, according to conventional techniques.

According to FIG. 3, the prior art processes of producing an ASIC involving a DSP, involves a first step 100A. An evaluation chip is designed and produced, including hardware and software, which involves the redesign of a DSP and the instruction set for the DSP. This evaluation chip 101, as shown in FIG. 7, is placed within an emulator 102 according to step 110 of FIG. 3. A host computer 103 is connected through suitable cabling 104 to the emulator 102 in accordance with step 110. Further cabling 105 connects an application system 106 through a socket 107 to the emulator 102. The target system 106 is provided by a particular user who wants an ASIC designed for such a target system or application. The chip manufacturer will conduct the process according to FIG. 3. The system evaluation, according to step 120 of FIG. 3, will involve the evaluation conducted by the emulator, the host computer 103 and the target application system 106 provided by the user. After all problems have been resolved, the final chip is produced according to step 130, and a production run of the chips is made according to the number of chips desired by the user who provided the target application system 106. The process as set forth in FIG. 3, for the conventional chip manufacturing prior to the present invention, involves a period of time that may be as little as six months, but is usually one year and many times two years in the undertaking. This long period of time is necessary because the digital signal processor is redesigned to fit the particular application of the target system 106 and accordingly new instruction sets are provided. All of these need designing, testing, debugging and evaluation.

Figure 4:
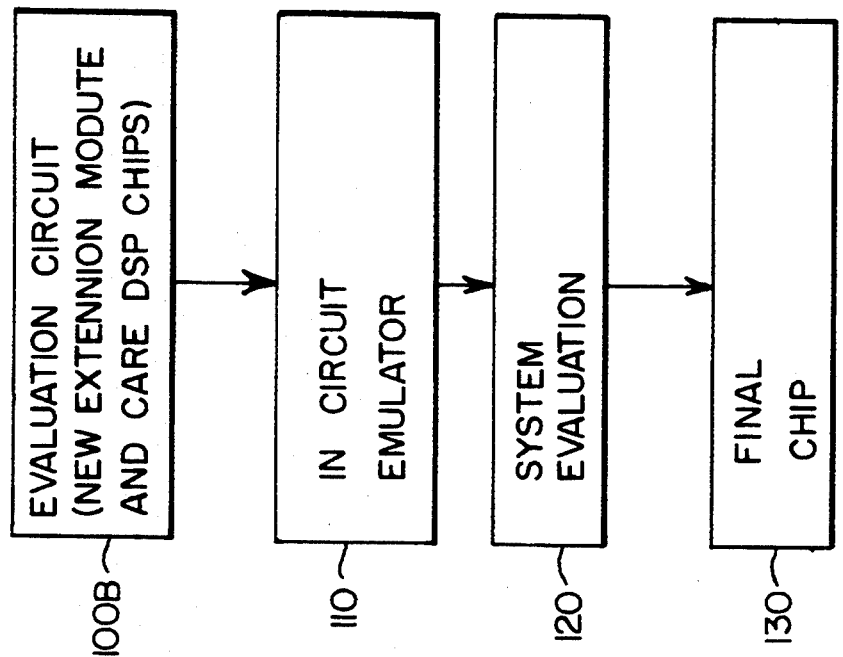
FIG. 4 is a flow chart showing the corresponding development of an ASIC according to the present invention.
Figure 6:
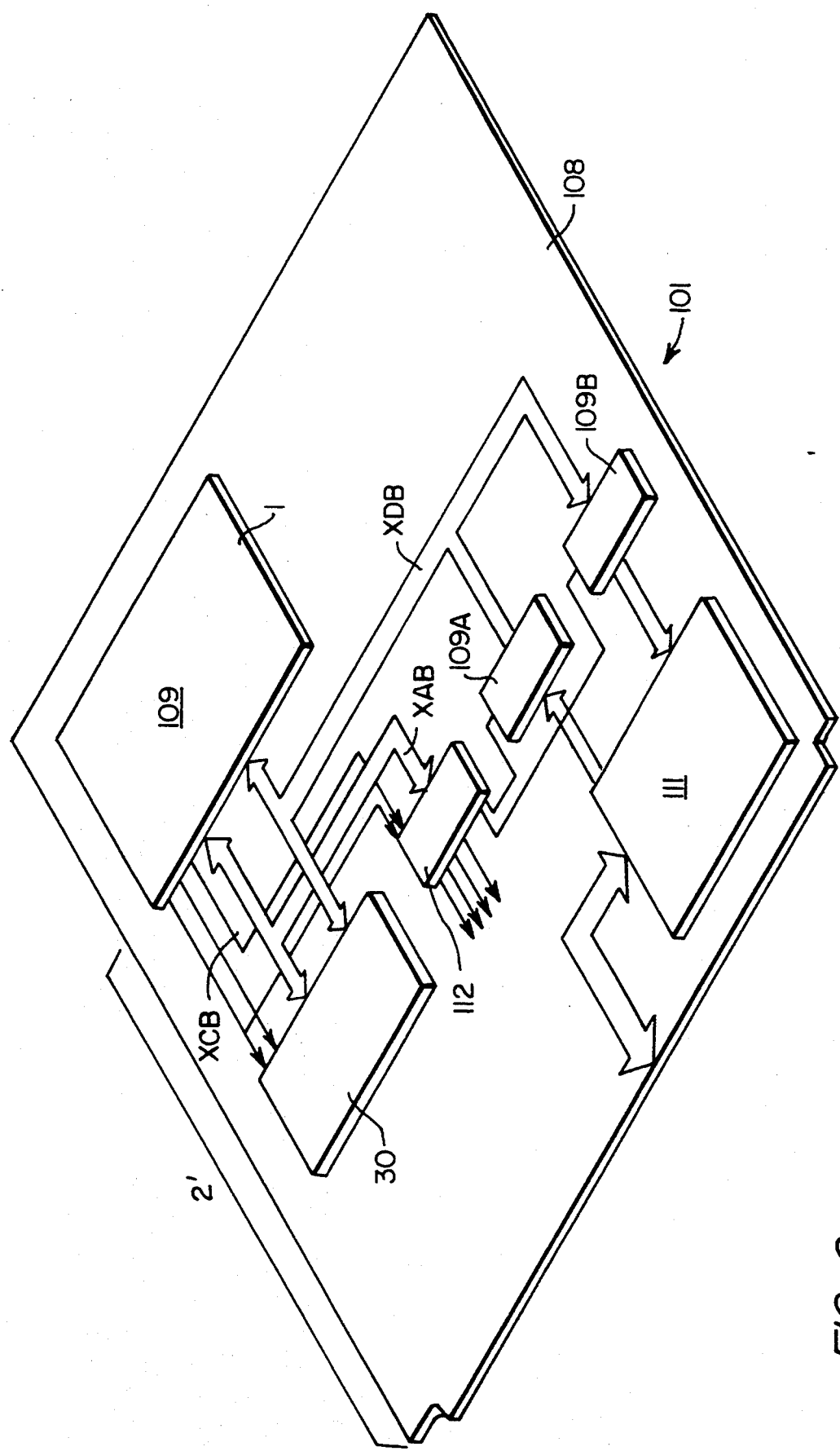
FIG. 6 shows an evaluation board usable with the present invention.

According to the present invention, as shown in FIG. 4, step 100B differs from step 100A of FIG. 3 by providing an evaluation circuit that consists of the DSP core 1 of FIG. 1 that can be constructed as a single chip that is standard, so that it has already been designed, already been tested, already been evaluated, and already has its complete operative instruction set, and is reliable and easily manufactured because it has been used in many different applications in the past. This evaluation circuit may take the form as shown in FIG. 6, which comprises a printed circuit board 108 having the core chip 109 that consists of the core DSP 1 shown in FIG. 1. Further, this evaluation circuit, according to the present invention, will include the newly designed extension module, which is, for example, composed of an extension memory 30, and analog to digital converter 109A, a digital to analog converter 109B, an extension I/O interface 111 connected to 106, extension data bus XDB, extension address bus XAB, extension control bus XCB, and a decoder 112 that is connected through cable 105 to the target application system 106. Alternatively, the entire circuit shown in FIG. 6 may be constructed at this stage on a single chip for purposes of testing. The construction on a single chip is quite easy, since the maps and instruction set and everything else needed to construct the DSP core 109 are already on hand. The core DSP 1 is formed on a separate portion of the substrate independently of the extension module with identical masks and other structure regardless of the extension module construction. The extension module is formed on another portion of the same substrate. According to step 110 of FIG. 4, the evaluation circuit contained on the printed circuit board 108 of FIG. 6 is inserted into the emulator 102 in accordance with step 110 shown in FIG. 7. Thereafter, steps 110, 120 and 130 of FIG. 4 are identical to the corresponding steps 110, 120 and 130 in FIG. 3. According to the process of FIG. 4, no additional evaluation software or hardware is required for the core DSP for any new extension module design and evaluation. The entire process, according to the present invention, shown in FIG. 4 can be accomplished in one week to one month as compared to six months to two years for the conventional technique, which is a considerable savings in time, expense and manpower.

A further ASIC, that is another design of an ASIC in addition to the ASIC shown in FIG. 6 and the ASIC shown in FIG. 1, is now described with respect to FIG. 8. In FIG. 8, the core DSP 1 is identical to the core DSP is the previously discussed examples of an ASIC. In FIG. 8, the extension module 2" includes a timer 31", address decoder 33", extension address bus XAB, extension data bus XDB, extension control bus XCB, analog to digital converter A/D, digital to analog converter D/A, input register I, output register 0, and the various external chip terminals XI for parallel input, XO for parallel output, XCP for timing signals, XDO for data out and XDI for data in, all of which are connected by cabling in the final installation to the user's target application 106 when in actual use, and also during evaluation in accordance with FIG. 7.

More details of the core DSP of FIG. 1 are shown in FIG. 5, wherein like numerals apply, and in addition some variations are shown as described. In FIG. 5, the address bus AB1 contains address lines AO through A11, although any number may be used.

The data bus contains data lines DO through D15, although any number can be used. The control bus includes control lines MR/W, MAS, and IOS, with their respective high or low active states being shown in the drawing. For purposes of convenience, the multiplier 8 and ALU 9 are shown as a combined unit 8, 9. For convenience, portions of FIG. 1 that are identically used in the circuit of FIG. 5 are not shown, for example the instruction control loop and the host interface portion 16. Mainly, FIG. 5 employs the addition of two multiplexers 22A and 22B, which perform the functions of multiplexer 22 in FIG. 1, with DB2 and DB3 having their own respective multiplexers 22A and 22B for control of the extension module selectively with the core DSP, in addition to the control register 24, there is provided the decoder 24A. Various inverters, gates and buffers are shown and operate according to conventional logic as shown in the diagram so that further description is unnecessary.

Figure 9:
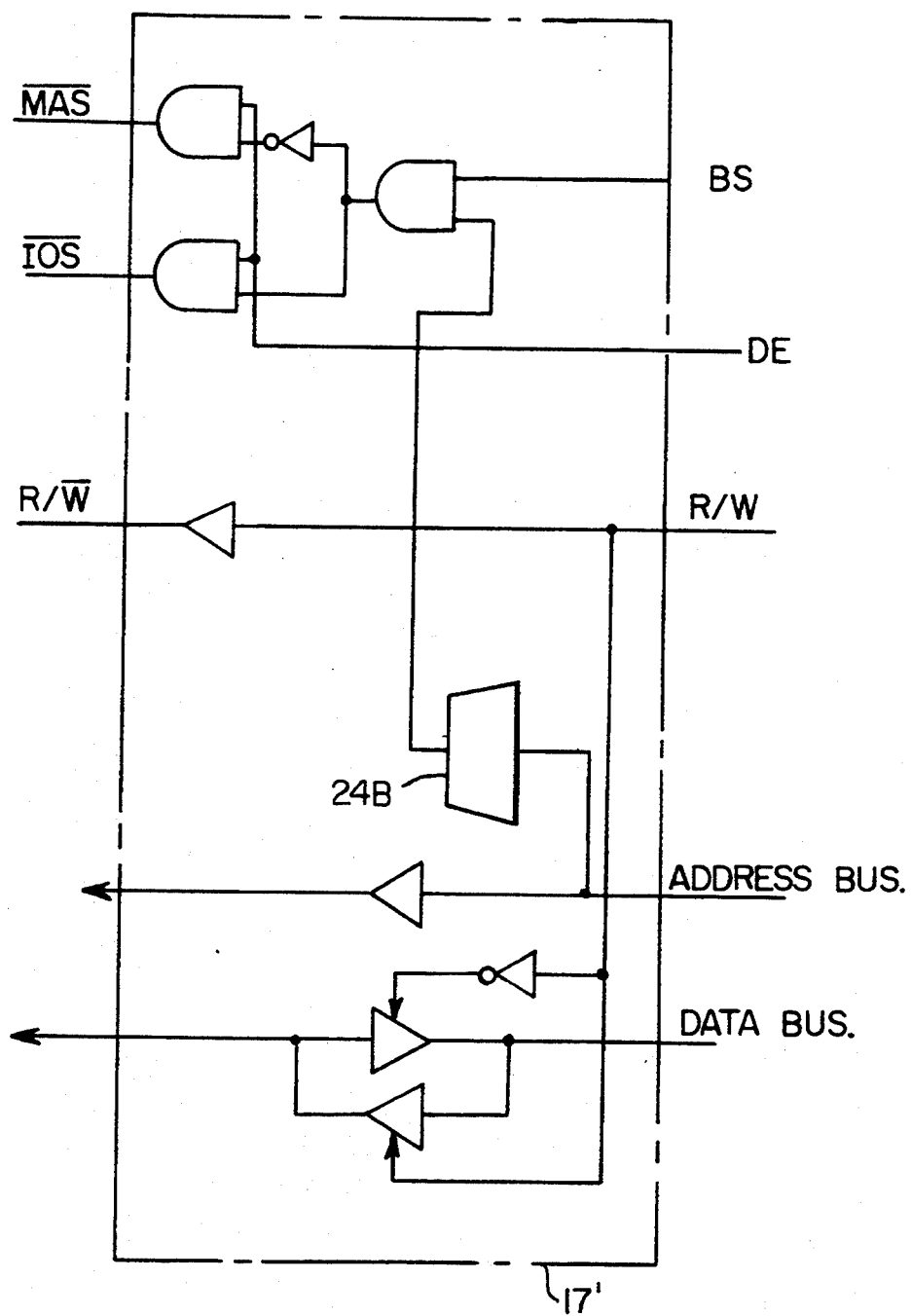
FIG. 9 shows a modification of the extending interface portion of FIG. 1.

A modification of the extension interface according to FIG. 1 is shown in FIG. 9, according to conventional logic with respect to the conventional gate, buffer, inverter, and connection symbols together with the decoder 24B, so that its operation is clear.

While preferred embodiments along with variations and modifications have been set forth for disclosing the best mode and important details, further embodiments, variations and modifications are contemplated according to the broader aspects of the present invention, all as set forth in the spirit and scope of the following claims.

I claim:

1. A digital signal processor, comprising:
   a first block including first memory means for storing data, first data bus means for transferring data from and to said first memory means, first address bus means for transferring address signals to said first memory means and first control bus means for transferring control signals to said first memory means;
   a second block including,
   second memory means for storing data,
   an arithmetic logic unit (ALU),
   a control circuit having an instruction set memory and decoder means for decoding instructions from said instruction set memory,
   storage means set with operation data to designate one operation state of first and second operation states in accordance with an instruction from said instruction set memory, wherein said storage means outputs a first control signal when the operation data designating the first operation state is set and outputs a second control signal when the operation data designating the second operation state is set,
   host interface means for coupling to a host computer,
   second data bus means for coupling said second memory means, said arithmetic logic unit, said storage means, and said host interface means,
   second address bus means for coupling said second memory means and said control circuit, and
   second control bus means for coupling said control circuit, and said second memory means; and
   interface means for electrically coupling said first data bus means and said first address bus means to said second data bus means and said second address bus means, respectively when the first control signal is provided from said storage means for providing said arithmetic logic unit with data from said first memory means when said interface means is provided with said first control signal, and for providing said arithmetic logic unit with data from said second memory means when said interface means is provided with said second control signal.

2. The digital signal processor according to claim 1, wherein said second block includes a multiplier circuit coupled to said second data bus means and to said second address bus means.

3. The digital signal processor according to claim 2, wherein said first and second data bus means provides parallel data buses between said second memory means and said multiplier circuit, parallel data buses between said second memory and said arithmetic logic unit, and a single data bus between said multiplier circuit and said arithmetic logic unit.

4. The digital signal processor according to claim 2, wherein said second memory means for storing data includes a RAM and a ROM;
   each of said first and second control bus means including read/write control lines for said first and second memory means;
   wherein said host interface means includes parallel and serial output ports, and parallel and serial input ports; and
   said interface means including an output buffer and an input buffer coupled with said first and second data bus means.

5. The digital signal processor according to claim 4, wherein said first and second data bus means provides parallel data buses between said second memory means for storing data and said multiplier circuit, parallel data buses between said second memory means for storing data and said arithmetic logic unit, and a single data bus between said multiplier circuit and said arithmetic logic unit.

6. The digital signal processor according to claim 5, wherein all of said first and second blocks are on a single integrated chip.

7. A plurality of single chip integrated circuits, each constructed according to claim 6, wherein each of said second blocks is of identical construction respectively on a single integrated chip; and wherein said first blocks are of at least two different constructions and circuit configurations, so that said second blocks may be used to efficiently construct different application specific integrated circuits.

8. The digital signal processor according to claim 1, wherein said interface means includes buffer means for coupling said first control bus means to said second control bus means when said storage means outputs said first control signal and switching means for coupling said first data bus means to said second data bus means when said storage means outputs said first control signal.

9. The digital signal processor according to claim 8, wherein said second block includes a multiplier circuit coupled to said second data bus means and to said second address bus means.

10. The digital signal processor according to claim 1, wherein said first memory means has an address map that is a duplicate portion of an address map of said second memory means; and
   said first block further having timer means, input/output means, D/A converter means and A/D converter means coupled to said first data bus means, said first address bus means and said first control bus means.

11. The digital signal processor according to claim 1, wherein said first and second blocks are entirely constructed on two separate portions respectively of a single semiconductor chip as an integrated circuit.

12. A plurality of digital signal processors according to claim 11, including a plurality of said first blocks of identical construction and each respectively on a single integrated chip; and including a plurality of said second blocks of at least two different constructions and circuit configurations, so that said first blocks may be used to efficiently construct different application specific integrated circuits.

13. The digital signal processor according to claim 12, wherein said second block includes a multiplier circuit coupled to said second data bus means and to said second address bus means.

14. The digital signal processor according to claim 13, wherein said first and second data bus means provides parallel data buses between said second memory means for storing data and said multiplier circuit, parallel data buses between said second memory means storing data and said arithmetic logic unit, and a single data bus between said multiplier circuit and said arithmetic logic unit.

15. The digital signal processor according to claim 14, wherein said interface means includes buffer means for coupling said first control bus means to said second control bus means when said storage means outputs said first control signal and switching means for coupling said first data bus means to said second data bus means when said storage means outputs said first control signal.

16. A digital signal processor comprising:
   a first block, including:
   a data input/output circuit having an address,
   first data bus means for transferring data to the data input/output circuit,
   first address bus means for transferring address signals to the data input/output circuit, and
   first control bus means for transferring control signals to the data input/output circuit; and
   a second block, including:
   memory means for storing data, wherein the memory means has an address map that has a portion that is a duplicate of the data input/output circuit;
   an arithmetic logic unit,
   a control circuit having an instruction set memory and decoder means for decoding instructions from said instruction set memory,
   storage means set with state data to designate one operation state of first and second operation states in accordance with an instruction from said instruction set memory,
   said storage means outputting a first control signal when the state data designates the first operation state is set and outputting a second control signal when the state data designates the second operation state is set,
   host interface means for coupling a host computer,
   second data bus means for coupling said memory means to each of said arithmetic logic unit, said storage means and said host interface means for the transfer of data;
   second address bus means for coupling said memory means and said control circuit for the transfer of address signals;
   said control bus means for coupling said control circuit, and said memory means for the transfer of control signals;
   interface means for electrically coupling the first data bus means, the first address bus means and the first control bus means to the second data bus means, the second address bus means and the second control bus means, respectively, when said first control signal is provided from said storage means;
   said interface means disabling the data input/output circuit when the address of the data input/output circuit corresponds to an address signal provided from the control circuit; and
   said interface means electrically uncoupling the first data bus means, the first address bus means and the first control bus means from the second data bus means, the second address bus means and the second control bus means, respectively, when said second control signal is provided from said storage means.

17. The digital signal processor according to claim 16, wherein said second block includes a multiplier circuit coupled to said second data bus means and said second address bus means.

18. The digital signal processor according to claim 17, wherein said memory means for storing data includes a RAM and a ROM;
   each of said first and second control bus means including a read/write control line and data enable signal line for said first and second means; and
   said host interface means including parallel and serial output ports, and parallel and serial input ports.

19. The digital signal processor according to claim 17, wherein the first block further includes timer means coupled to said first data bus means, said first address bus means and said first control bus means; and the timer means having an address that is duplicated in the address map of the memory means.

20. The digital signal processor according to claim 17, wherein the first block further includes second memory means coupled to said first data bus means, said first address bus means and said first control bus means; and the second memory means is duplicated in the address map of the memory means.

21. The digital signal processor according to claim 18, wherein the first block further includes second memory means coupled to said first data bus means, said first address bus means and said first control bus means; and the second memory means is duplicated in the address map of the memory means.

22. The digital signal processor according to claim 18, wherein the first block further includes timer means coupled to said first data bus means, said first address bus means and said first control bus means; and the timer means having an address that is duplicated in the address map of the memory means.

23. The digital signal processor according to claim 22, wherein the first block further includes second memory means coupled to said first data bus means, said first address bus means and said first control bus means; and the second memory means is duplicated in the address map of the memory means.

24. The digital signal processor according to claim 23, wherein the first block further includes second memory means coupled to said first data bus means, said first address bus means and said first control bus means; and the second memory means is duplicated in the address map of the memory means.

25. The digital signal processor according to claim 16, wherein said memory means for storing data includes a RAM and a ROM;
  each of said first and second control bus means including a read/write control line and data enable signal line for said first and second means; and
  said host interface means including parallel and serial output ports, and parallel and serial input ports.

26. The digital signal processor according to claim 25, wherein the first block further includes timer means coupled to said first data bus means, said first address bus means and said first control bus means; and the timer means having an address that is duplicated in the address map of the memory means.

27. The digital signal processor according to claim 26, wherein the first block further includes second memory means coupled to said first data bus means, said first address bus means and said first control bus means; and the second memory means is duplicated in the address map of the memory means.

28. The digital signal processor according to claim 16, wherein the first block further includes timer means coupled to said first data bus means, said first address bus means and said first control bus means; and the timer means having an address that is duplicated in the address map of the memory means.

29. The digital signal processor according to claim 28, wherein the first block further includes second memory means coupled to said first data bus means, said first address bus means and said first control bus means; and the second memory means is duplicated in the address map of the memory means.

30. A digital signal processor, comprising:
  a data input/output circuit having an address,
  first data bus means, coupled to the data input/output circuit, and for transferring data,
  first address bus means for transferring address signals,
  first control bus means for transferring control signals, and
  first decoder means, coupled to the first address bus means and to the first control bus means, and for outputting one of selection and non-selection signals for indicating whether the data input/output circuit is selected, by decoding the address and control signals,
  memory means for storing data, wherein the memory means has an address map that has a portion that is a duplicate of the data input/output circuit,
  an arithmetic logic unit (ALU),
  a control circuit having an instruction set memory and second decoder means for decoding instructions from the instruction set memory,
  storage means set with operation data for designating one operation state of first and second operation states in accordance with an instruction from the instruction set memory, wherein the storage means outputs a first control signal when the operation data designating the first operation state is set and outputs a second control signal when the operation data designating the second operation state is set,
  host interface means for coupling a host computer,
  second data bus means coupled the memory means to each of the arithmetic logic unit, the storage means and the host interface means, and for transferring data,
  second address bus means coupled the memory means to the control circuit, and for transferring address signals,
  second control bus means coupled the memory means to the control circuit, and for transferring control signals,
  interface means for electrically coupling the first data bus means, the first address bus means and the first control bus means to the second data bus means, to the second address bus means and to the second control bus means, respectively, wherein the interface means provides a control signal for enabling a selection operation of the first decoder means, to the first decoder means when the second control signal is provided from the storage means,
  wherein the data input/output circuit is selected by the selection signal of the first decoder means when the storage means outputs the second control signal, if the address of the data input/output circuit is provided to the first decoder means from the control circuit, and
  wherein the data input/output circuit is not selected by the non-selection signal of the first decoder means when the storage means outputs the first control signal, even though the address of the data input/output circuit is provided to the first decoder means from the control circuit.

31. The digital signal processor according to claim 30, further comprising a multiplier circuit coupled to the arithmetic logic unit and to the memory means.

32. The digital signal processor according to claim 31, wherein the memory means for storing data includes a RAM and a ROM.

33. The digital signal processor according to claim 32, wherein the host interface means includes input means for converting serial data into parallel data, and output means for converting parallel data into serial data.

34. The digital signal processor according to claim 33, wherein the control signal for enabling the selection operation of the first decoder means is a data enable signal.

35. The digital signal processor according to claim 34, further comprising timer means, which has an address that is duplicated in the address map of the memory means, which is coupled to third decoder means coupled with the first address and control bus means and to the first data bus means, and which is selected by the third decoder means.

36. The digital signal processor according to claim 35, further comprising second memory means coupled to the first data bus means, the first address bus means and the first control bus means, the second memory means is duplicated in the address map of the memory means.

37. A digital signal processor, comprising:
a data input/output circuit having an address,
first data bus means, coupled to the data input/output circuit, and for transferring data,
memory means for storing data, wherein the memory means has an address map that has a portion that is a duplicate of the data input/output circuit,
an arithmetic logic unit (ALU),
a control circuit having an instruction set memory and second decoder means for decoding instructions from the instruction set memory,
storage means set with operation data to designate one operation state of first and second operation states in accordance with an instruction from the instruction set memory, wherein the storage means outputs a first control signal when the operation data designating the first operation state is set and outputs a second control signal when the operation data designating the second operation state is set,
host interface means for coupling a host computer,
second data bus means coupled with each of the memory means, the arithmetic logic unit, the storage means and the host interface means, and for transferring data,
third data bus means coupled with the memory means, and for transferring data,
second address bus means coupled the memory means to the control circuit, and for transferring address signals,
second control bus means coupled the memory means to the control circuit, and for transferring control signals,
switching means for coupling one of the first and third data bus means to the arithmetic logic unit, wherein the switching means couples the third data bus means to the arithmetic logic unit when the storage means outputs the first control signal, and wherein the switching means couples the first data bus means to the arithmetic logic unit when the storage means outputs the second control signal.

38. The digital signal processor according to claim 37, further comprising a multiplier circuit coupled to the arithmetic logic unit and to the memory means.

39. The digital signal processor according to claim 38, wherein the memory means for storing data includes a RAM and a ROM.

40. The digital signal processor according to claim 39, wherein the host interface means includes input means for converting serial data into parallel data, and output means for converting parallel data into serial data.

41. The digital signal processor according to claim 40, further comprising first address bus means for transferring address signals and first control bus means for transferring control signals.

42. The digital signal processor according to claim 41, further comprising first decoder means, coupled to the first address bus means and to the first control bus means, and for outputting one of selection and non-selection signals for indicating whether the data input/output circuit is selected, by decoding the address and control signals.

43. The digital signal processor according to claim 42, further comprising interface means for electrically coupling the first data bus means, the first address bus means and the first control bus means to the second data bus means, to the second address bus means, and to the second control bus means, respectively.

44. The digital signal processor according to claim 43, wherein the interface means provides a control signal for enabling a selection operation of the first decoder means, to the first decoder means when the second control signal is provided from the storage means.

45. The digital signal processor according to claim 44, wherein the data input/output circuit is selected by the selection signal of the first decoder means when the storage means outputs the second control signal, if the address of the data input/output circuit is provided to the first decoder to the first decoder means from the control circuit, and wherein the data input/output circuit is not selected by the non-selection signal of the first decoder means when the storage means outputs the first control signal, even though the address of the data input/output circuit is provided to the first decoder from the control circuit.

46. The digital signal processor according to claim 45, further comprising timer means, which has an address that is duplicated in the address map of the memory means, which is coupled to third decoder means coupled with the first address and control bus means and to the first data bus means, and which is selected by the third decoder.

47. The digital signal processor according to claim 46, further comprising second memory means coupled to the first data bus means, first address bus means and the first control bus means, the second memory means is duplicated in the address map of the memory means.

* * * * *